Dec. 28, 1954 P. A. ROOS 2,698,356

COMBINED MOTION-PICTURE AND TELEVISION CAMERA

Filed Oct. 17, 1951

PAUL A. ROOS,
INVENTOR.

BY George T. Smyth

ATTORNEY.

United States Patent Office
2,698,356
Patented Dec. 28, 1954

2,698,356

COMBINED MOTION-PICTURE AND TELEVISION CAMERA

Paul A. Roos, Los Angeles, Calif.

Application October 17, 1951, Serial No. 251,681
8 Claims. (Cl. 178—6.8)

This invention relates to cameras and more particularly to a composite camera employing a single objective lens system for simultaneously producing identical images on different medio but not necessarily of the same size. The camera of the present invention is particularly useful in simultaneously recording on motion picture film and a television transmission or pickup apparatus images of an acted scene or actual event. This has been heretofore accomplished by placing a motion picture camera and a television camera side by side and simultaneously taking pictures with each camera. In this type of dual camera arrangement obviously the images reproduced are dissimilar even if lenses of the same relative focal length are used in each camera. This is so for the horizontally displaced lenses of the two cameras obviously will see different fields.

To obviate this difficulty it has also been proposed to take motion pictures of an image of an acted scene or actual event as reproduced on the screen of a television receiving apparatus. Although the photographed images of the televised image of the scene or event are duplicates, the photographed image when reproduced by subsequent telecasts was of such poor quality when viewed on a television receiving apparatus as to be objectionable.

The camera arrangement of the present invention obviates all of the difficulties of the prior proposals, for a single objective lens system is used for both the motion picture film and the pickup tube of the television transmission apparatus. The camera arrangement of the present invention will thus simultaneously provide identical images of the scene or event on the film and the tube of the television transmission apparatus. This is brought about in the present invention by deflecting a predetermined quantum of the image-forming light rays as they exit from the objective lens system onto the pickup tube of the television transmission apparatus, the remainder being directed through a conventional motion picture shutter onto the film as it is fed past a suitable aperture. As the motion picture of the scene or event is identical to the televised image of the same, the subsequent television transmission of the motion picture will obviously be identical with the image first transmitted.

A further feature of the camera arrangement of the present invention is the provision of a relay lens between the objective and the television transmission apparatus which is of such a focal length and relative aperture as to provide a depth of focus less than or at least not greater than the depth of focus of the objective lens. This arrangement provides, together with the usual monitor tube forming the view finder of the television transmission apparatus, a monitoring means for visually determining focus and aperture setting of the single objective lens. An operator by merely viewing the image as formed on the viewing screen of the usual tube supplied with television cameras, can, through remote control means, focus the objective lens as well as set the proper aperture opening for the light conditions of the scene or event being photographed.

Other features and advantages of the present invention will be hereinafter apparent from the following description particularly when taken in connection with the accompanying drawing, in which.

Figure 1:
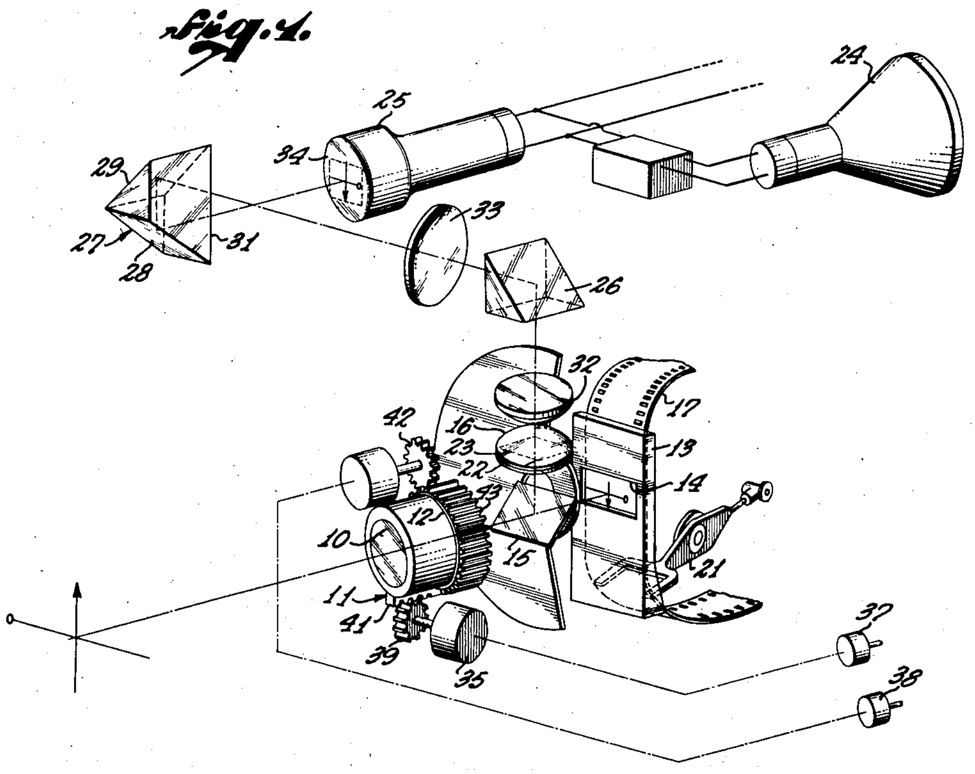
Figure 1 is a schematic illustration of the camera arrangement.
Figure 2:
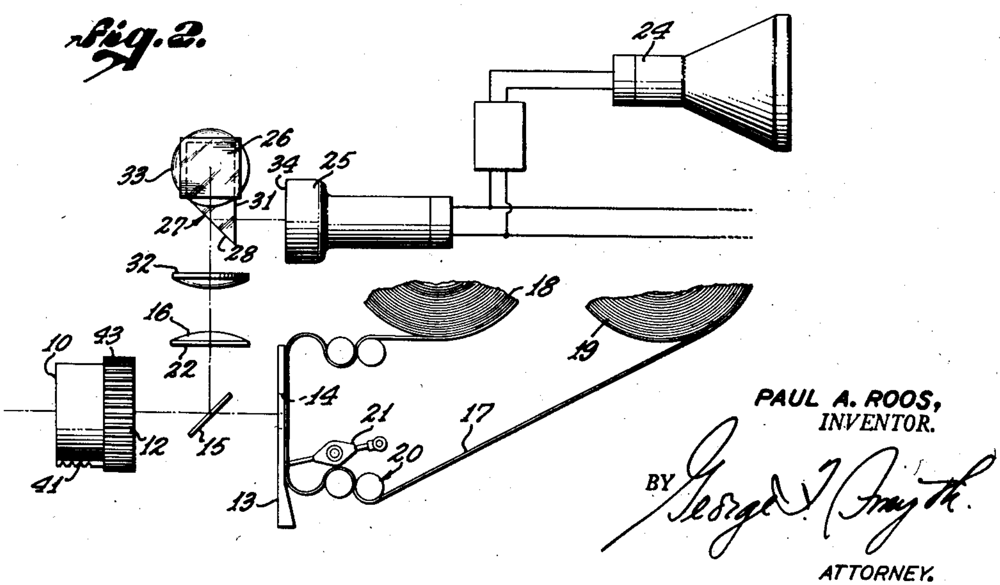
Figure 2 shows in cross-section and diagrammatically the composite camera of the present invention.

The camera arrangement of the present invention, referring now to the drawing, comprises an objective lens 10 including a mounting means 11 in which the lens barrel is mounted for movement to permit focusing of the lens. This mounting means may comprise conventional mounting means for such lenses which are usually provided with internal thread means cooperative with external thread means formed on the lens barrel for axially moving the lens as the barrel is rotated.

The objective lens 10, furthermore, includes an aperture stop not shown, but variable by means of an operating member including a movable sleeve 12. Arranged between the objective lens 10 and a motion picture film guide or gate 13 having the usual aperture 14, is a beam splitting element 15. This element, in the illustrated embodiment of the present invention, comprises a small, transparent plate angularly intersecting the path of the image forming light rays emerging from the objective 10. This plate is fixedly mounted in position and carries on its front surface a film of some suitable material of such a thickness that a predetermined quantum of the rays incident thereon are deflected upwardly through a field lens here shown at 16 as a single lens.

The light rays transmitted by the element 15 are imaged on motion picture film 17 through the aperture 14 of the film gate 13. This film is fed from a storage reel 18 past the aperture 14 to a take-up reel 19 by some conventional feed mechanism such as that indicated at 20. As in conventional picture cameras a shutter and film pull-down mechanism, indicated at 21, is used to provide the separate frames or images. The images so photographically formed on the film 17 are, of course, as in conventional motion picture cameras, inverted and reversed.

In the illustrated embodiment of the present invention the field lens 16 carries a transparent plate 22 on the inner face of which is formed a reticle 23. This reticle, as will be hereinafter shown, is imaged on the monitoring tube forming the viewing device 24 of the camera of the television transmission apparatus of which only the viewing device and pickup or orthicon tube 25 has been shown in the drawing. This reticle delineates or defines on this viewing device that portion of the field which preferably is that portion of the field of the objective lens which is imaged on the film 17. Thus, the visible field of the televised image as seen on the tube of a conventional television receiving apparatus will be substantially the same as that seen when the motion picture is projected and subsequently televised.

The field lens 16 serves its conventional function in the system to image the diaphragm of the objective lens 10 at or near the second element 33 of the relay lens system. The image forming rays emerging from the field lens 16 are deflected by a prism 26, or other reflecting element, laterally to a deflecting element 27 having a pair of internal reflecting surfaces 28 and 29 so angularly related that light incident on the face 31 of the prism is internally reflected to exit along a path displaced from the entrance path but normal thereto. The pickup or orthicon tube 25 of the television transmitting apparatus is arranged adjacent the prism 27 and in the path of the light rays deflected thereby.

Forming a part of the optical system of the camera arrangement of the present invention is a relay or erecting system here shown as a pair of lenses 32 and 33. In the illustrated embodiment of the present invention the lenses 32 and 33 are disposed in the system on opposite sides of the prism 26 although obviously both lenses could be disposed on one side or the other of this prism. In the arrangement shown the size of the prism 26 can be held to a minimum to reduce the cost of the same. The relay or erecting system formed by the lenses 32 and 33 serves to image the reticle 23 as well as the object provided by the real image formed by the objective lens 10 on the light sensitive surface 34 of the pickup tube 25 of the television transmission apparatus.

The image so formed by the relay lenses is preferably larger than the image produced by the objective lens 10 on the film 17, but of the same aspect ratio. The amount of magnification is of the order of 1.3:1 for 35 mm. film although other ratios could be employed if desired or found necessary. The field of view of the objective lens 10 imaged on the pickup tube 25 is otherwise identical to the image formed on the film 17.

The depth of focus of the relay lens system in the now preferred embodiment of the present invention is less than or at least not greater than the depth of focus of the objective lens 10. The depth of focus, therefore, of the lens system formed by the objective 10 and the lenses 32 and 33 is more critical than the objective lens alone. This lens preferably would have an aperture ratio of at least 2.5 while the aperture ratio of the system formed by the lenses 32 and 33 would be somewhat higher.

As the depth of focus of the image formed on the pickup tube 25 of the television transmission apparatus is less than the depth of focus of the field as imaged on the film 17, an operator by visually viewing the field as seen in the monitoring tube 24 can easily judge whether or not the lens system is properly focused. The television transmission pickup tube 25 is, as known, more critical insofar as light values are concerned than the usual black and white photographic film, so that changes in lighting conditions are more easily discerned visually from the image formed on the monitoring tube 24. Here again the operator can visually determine whether or not the exposure setting is correct for each particular lighting condition by merely visually examining the image formed on the view finder of the television transmission apparatus.

To permit an operator to change the focus of the lens system as well as the aperture setting, the present invention provides means adjacent the operating position of the cameraman to permit remote control of the operating sleeve 12 and the lens barrel of the objective lens 10. This remote control apparatus may comprise a pair of conventional synchronous repeaters 35 and 36 operable through manually controlled synchronous transmitters 37 and 38 respectively. The system 35 controls the relative axial position of the objective lens 10 and may comprise a small gear 39 meshing with and driving a rack 41 carried by the lens barrel of the objective lens.

Thus it will be seen that rotation of the gear 39 in one direction or the other will axially move the lens barrel of the objective system either in or out depending upon the direction of rotation of the gear 39. The system 36 includes a gear 42 meshing with and driving the sleeve 12 which carries teeth, shown at 43, engaged by the teeth of the gear 42. It should be obvious that rotation of the gear 42 in one direction or the other will rotatably drive the sleeve 12 to either open or close down the aperture depending upon the direction of rotation of the gear 42.

In either system the direction of rotation of the gears will depend upon the operation of the synchronous transmitters 37 and 38 under the manual control of the operator or cameraman. The arrangement is such that if the operator visually determines, by viewing the image formed on the tube 24, that the exposure or focus must be changed, he is able to change both the aperture opening and the focus by the remote control means just described. Once the image formed on the tube 24 is determined to be in focus and at the proper exposure for the prevailing light conditions, the image formed on the motion picture film 17 will also be in focus and at the proper exposure.

In some installations it may be desirable to mount a relay lens system between the beam splitter 15 and the film gate 13. This would permit, as should be understood, the arrangement of the motion picture device at a greater distance from the objective lens 10 than would be otherwise possible. This relay lens system, if used, would have such a focal length and relative aperture as to provide a depth of focus greater than or at least not less than the depth of focus of the relay system formed by the lenses 32 and 33. This would permit an operator, as in the earlier described embodiment of the invention, to visually determine the proper aperture opening, as well as the focus of the objective lens, merely by viewing the image as formed on the viewing or monitoring screen of the television transmission apparatus.

Although the now preferred embodiment of the present invention has been shown and described herein, it is to be understood that the invention is not to be limited thereto for it is susceptible to changes in form and detail within the scope of the appended claims.

I claim:

1. A device for simultaneously recording substantially identical images on motion picture film and television pickup apparatus, comprising: a motion picture camera device; an electronic image pickup device; an objective lens for imaging the field thereof on motion picture film moving through said motion picture camera device; means fixed in optical alignment with said objective lens for dividing the image forming rays from said objective lens; a lens system optically aligned with the light rays divided for imaging on said pickup device an image of the field of said objective lens substantially identical to the image of said field formed on said motion picture film, said lens system having such a focal length and relative aperture as to provide a depth of focus less than the depth of focus of the objective lens; and an electronic viewing device visible to the operator to reproduce the image formed on said pickup device whereby the operator can visually determine focus and aperture setting of said objective lens.

2. A device for simultaneously recording substantially identical images on motion picture film and television pickup apparatus, comprising: a motion picture camera and television transmitter pickup apparatus associated therewith; optical lens means including an adjustable diaphragm for varying the relative aperture of said lens means, for forming an image of the field on a motion picture film moving through said motion picture camera; means for deflecting a predetermined quantum of the light rays from said lens means; and optical means, including reflecting and refracting elements, for directing said deflected rays onto said pickup apparatus and for imaging the field of said lens means in said pickup apparatus; the focal length of said optical means being substantially greater than the focal length of said first named optical means whereby the depth of focus of said lens means is greater than the depth of focus of the optical system formed by said lens means and said optical means; an electronic viewing means visible to the operator of said device to reproduce the image formed on said pickup apparatus; and means, including means adjacent said viewing means, and operatively connected to said diaphragm, for selecting the proper relative aperture of said lens means as visually determined by the image formed on said viewing means.

3. In a device of the character described, the combination of: an objective lens; means to split the light from said lens into two beams; a motion picture camera for receiving film on which the image formed by one of said beams is focussed; and an electronic image pickup device to receive the image formed by the other of said beams; an electronic viewer at a monitoring station on said device to reproduce the image as formed on said pickup device; and remote control means at said monitoring station operatively connected with said objective lens for focus adjustment thereof to correct the focus of the image on said viewer when required, and thereby to simultaneously adjust the focus of the image in the motion picture camera.

4. A device as set forth in claim 3 which includes means to shorten the depth of focus of the beam to the pick-up device relative to the depth of focus of the beam to the motion picture camera whereby sharpness of focus of the image on the viewer is assurance of sharpness of focus of the image in the motion picture camera.

5. In a camera device of the character described, the combination of: a single objective lens; means to split the image-forming light rays from said lens into two beams; a motion picture device through which film is passed to receive the image formed by one of said beams; and an electronic image pickup device to receive the image formed by the other of said beams; optical means for directing said other beam onto said pickup device; an electronic viewer at a monitoring station on said camera device to reproduce the image on said pickup device; remote control means at said monitoring station operatively connected with said objective lens for focus adjustment thereof to correct the focus of the image on the viewer thereby to correct the focus of the image in the motion picture camera when required; and remote control means at said monitoring station operatively connected with said objective lens for aperture adjustment thereof to correct the brightness of the image on the viewer when required thereby to insure adequate exposure of the film in the motion picture camera.

6. A system as set forth in claim 5 which includes means to shorten the depth of focus of the beam directed onto the pickup device relative to the depth of focus of the beam to the motion picture camera whereby sharpness of focus of the image on the viewer is assurance of sharpness of focus of the image in the motion picture camera.

7. In a device of the character described the combination of: a motion picture camera; an electronic image pickup device; an objective lens; means to divide the light from said objective lens into a first and second beam, said first beam focused in said motion picture camera to form an image of the field of said objective lens on motion picture film passed through said camera; a lens system to focus said second beam on said pickup device, the depth of focus of said objective lens combined with said lens system being less than the depth of focus of the objective lens alone; an electronic viewer at a monitoring station on said device to reproduce the image on said pickup device; remote control means at said monitoring station operatively connected with said objective lens for focus adjustment thereof to correct the focus of the image on the viewer thereby to insure correct focus of the image in the motion picture camera; and remote control means at said monitoring station operatively connected with said objective lens for aperture adjustment thereof to correct the brightness of the image on the viewer when required thereby to insure adequate exposure of film in the motion picture camera.

8. In a system of the character described the combination of: a motion picture camera device; an electronic image pickup device; an objective lens means; means fixed in optical alignment with said lens means to divide the light from said objective lens means into a first beam focused in said motion picture camera device and a second beam to be imaged in said pickup device; a lens system optically coacting with said objective lens means to focus said second beam in said pickup device, whereby light rays reaching the pickup device passes through more lens elements than light reaching said motion picture camera device; an electronic viewer to reproduce the field of said objective lens means imaged on said pickup device; and a reticle in said lens system to indicate an image field on said pickup device corresponding to the image field in said motion picture camera device.

References Cited in the file of this patent

UNITED STATES PATENTS

| Number | Name | Date |
|---|---|---|
| 2,420,197 | Rosenthal | May 6, 1947 |
| 2,420,198 | Rosenthal | May 6, 1947 |
| 2,426,184 | Deloraine et al. | Aug. 26, 1947 |